United States Patent [19]

Usick

[11] Patent Number: 4,723,558
[45] Date of Patent: Feb. 9, 1988

[54] ATTACHMENT FOR THE CLEANING SIEVE OF A COMBINE HARVESTER

[76] Inventor: Cliff Usick, Box 25, Newdale, Manitoba, Canada, R0J 1J0

[21] Appl. No.: 806,953

[22] Filed: Dec. 9, 1985

[51] Int. Cl.<sup>4</sup> ............................................. A01F 12/32
[52] U.S. Cl. ......................................... 130/24; 130/26; 130/27 R
[58] Field of Search ...................... 130/27 Z, 24, 27 K, 130/27 J, 27 R, 27 AE, 27 HF, DIG. 1, 25, 26

[56] References Cited

U.S. PATENT DOCUMENTS

| | | |
|---|---|---|
| 756,121 | 3/1904 | Lazarus . |
| 1,344,599 | 6/1920 | Steinborn . |
| 1,527,090 | 3/1923 | Simard . |
| 1,689,314 | 10/1928 | Worthington ...................... 130/24 |
| 1,814,755 | 7/1931 | Johnson ............................... 130/24 |
| 2,212,092 | 8/1940 | Wood .................................. 130/24 |
| 2,649,760 | 8/1953 | Gustafson ........................... 130/24 |
| 3,472,235 | 10/1969 | Von Der Lely ................. 130/27 R |
| 4,253,471 | 3/1981 | Klimmer . |
| 4,344,443 | 8/1982 | DeBusscher et al. . |
| 4,441,511 | 4/1984 | Schroeder . |
| 4,475,561 | 10/1984 | Decoene et al. . |
| 4,510,946 | 4/1985 | Decoene et al. . |
| 4,531,528 | 7/1985 | Peters et al. . |

FOREIGN PATENT DOCUMENTS

| | | | |
|---|---|---|---|
| 1389155 | 11/1965 | France . | |
| 506627 | 12/1954 | Italy ..................................... | 130/27 |
| 1455765 | 11/1976 | United Kingdom .................. | 130/24 |

Primary Examiner—Stephen J. Novosad
Assistant Examiner—David J. Bagnell
Attorney, Agent, or Firm—Adrian D. Battison; Stanley G. Ade

[57] ABSTRACT

A combine harvester in the area of the grain pan and cleaning sieve which generally reciprocate longitudinally is modified by the provision of a pivot bar beneath the discharge end of the pan and carrying fingers projecting over the sieve. The pivot bar reciprocates with the sieve and is coupled to a lever the other end of which is attached to a second lever fixed to a stationary frame member. Thus the reciprocation of the bar in the direction of the sieve acts to pivotally rotate the fingers about the bar to lift the mat of grain and chaff deposited from the pan away from the sieve.

7 Claims, 3 Drawing Figures

U.S. Patent  Feb. 9, 1988  4,723,558
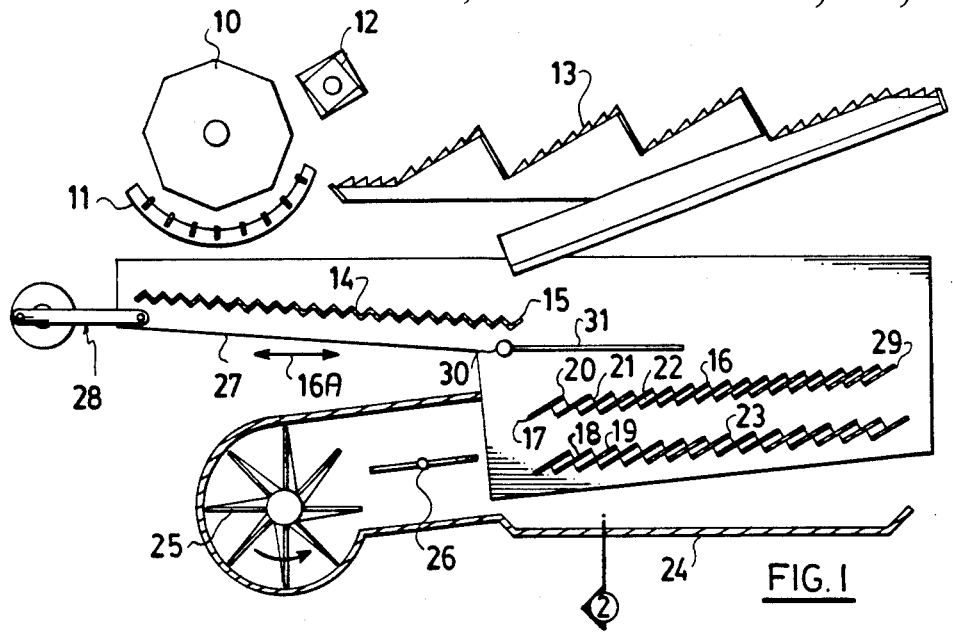
FIG. 1
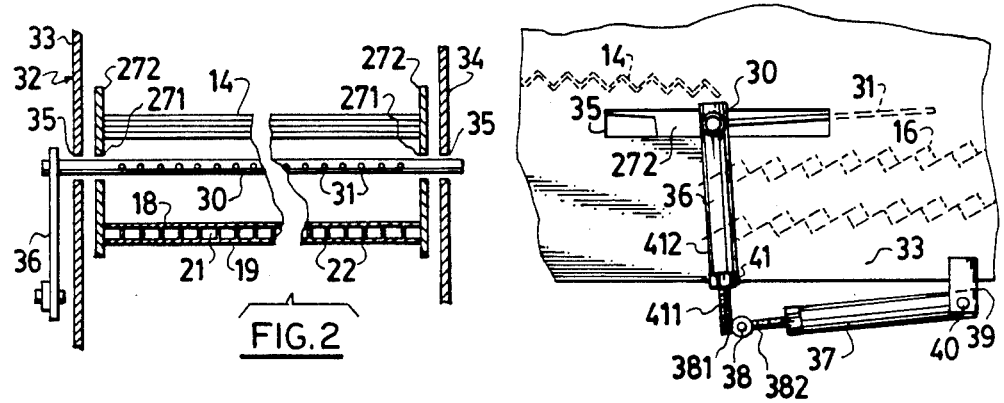
FIG. 2
FIG. 3

ATTACHMENT FOR THE CLEANING SIEVE OF A COMBINE HARVESTER

BACKGROUND OF THE INVENTION

This invention relates to an attachment for the cleaning sieve of a combine harvester and to a combine harvester including such an attachment.

Conventional combine harvesters generally include means for separating grain and chaff from straw of a harvested crop. In many cases this is carried out by a cylinder, concave and beater together with a plurality of straw walkers. The separated grain and chaff falls from the concave and straw walkers onto and is collected by a grain pan which extends beneath the general area of those parts. The grain pan is generally serrated so that a jerking reciprocating movement of the grain pan acts to transport the grain and chaff longitudinally of the pan toward the rear of the combine. From a discharge end of the grain pan, the chaff and grain falls generally downwardly onto a cleaning sieve or shoe which comprises an inclined surface which is perforated by a plurality of openings and is again reciprocated commonly with the pan so as to move the grain and chaff generally toward a rear discharge end of the sieve. Air is directed from a fan beneath the sieve through the openings so as to cause a separation of the lighter chaff from the heavier grain so that the chaff is thrown rearwardly over the discharge end of the sieve while the grain drops through the sieve onto a second cleaning sieve for further cleaning and collection.

The main effect which acts to cause the separation of the grain from the chaff is therefore that of an air separation using the air stream through the sieve. For this reason the perforations in the sieve are generally adjustable in size so as to increase or reduce the amount of air flow. This separation technique has become the standard for almost all combine harvester equipment but is not entirely satisfactory. Even in the best conditions under exact settings, grain can be lost in measurable quantities and this is accepted along with other losses which are conventional in farming.

However in cases where the amount of grain and chaff falling onto the sieve is either significantly increased or decreased from the optimum for which the settings have been chosen, the separation can seriously deteriorate. Thus if a reduced amount of grain and chaff is deposited upon the sieve, the air stream can be too great so that not only chaff but also some of the lighter grain can be ejected from the discharge end of the sieve.

In cases where the grain and chaff exceed the set amount, a mat of grain and chaff can form on the sieve since the airflow is generally too light so that the mat including significant quantities of grain discharged from the end of the sieve or even a serious blockage of the system can occur.

It is of course not possible to constantly reset the airflow in dependence upon variable crop amounts which can of course occur as the combine is moved from area to area depending upon soil conditions, ground contour and other factors.

SUMMARY OF THE INVENTION

It is one object of the present invention, therefore, to provide an attachment to the combine which assists in the separation of grain and chaff so as to avoid or reduce losses of grain due to improper separation.

According to a first aspect of the invention, therefore, there is provided a combine harvester for harvested crop comprising means for separating grain and chaff from straw of the harvested crop, a grain pan onto which the grain and chaff is deposited from said separating means, said grain pan having a discharge end from which the grain and chaff can fall, a cleaning sieve, means defining a plurality of openings thereon, means mounting said sieve with a feed end thereof at said discharge end of said grain pan for receiving said grain and chaff, fan means arranged beneath said sieve for directing air through said openings whereby the air passing therethrough tends to separate heavier grain from lighter chaff for the grain to pass through the openings under gravity while the chaff is discharged from a discharge end of said sieve remote from said feed end, means for reciprocatingly moving said grain pan and said sieve in a direction parallel to the direction of movement of said grain and chaff therealong, a pivot bar member arranged transversely of said direction of movement at said feed end of said cleaning sieve, grain and chaff engaging finger means mounted on said pivot bar member arranged in spaced relation along the pivot bar so as to extend therefrom over and along said cleaning sieve toward said discharge end of said cleaning sieve, and means for reciprocatingly pivoting said pivot bar member about an axis longitudinal thereto whereby to pivot said fingers from a position substantially directly overlying the sieve to a position raised therefrom at an acute acute angle thereto.

According to a second aspect of the invention there is provided an attachment for a combine harvester of the type comprising means for separating grain and chaff from straw of a harvested crop, a grain pan onto which the grain and chaff is deposited from said separating means, said grain pan having a discharge end from which the grain and chaff can fall, a cleaning sieve, means defining a plurality of openings therein, means mounting said sieve with a feed end thereof at said discharge end of said grain pan for receiving said grain and chaff, fan means arranged beneath said sieve for directing air through said openings whereby the air passing therethrough tends to separate heavier grain from lighter chaff for the grain to pass through the openings under gravity while the chaff is discharged from a discharge end of said sieve remote from said feed end, means for reciprocatingly moving said grain pan and said sieve in a direction parallel to the direction of movement of said grain and chaff therealong, said attachment comprising a pivot bar member arranged for mounting transversely of said direction of movement at said feed end of said cleaning sieve, grain and chaff finger means mounted on said pivot bar member and arranged in spaced relation along the pivot bar member so as to extend therefrom over and along said cleaning sieve towards said discharge end of said cleaning sieve, and means for reciprocatingly pivoting said pivot bar member about an axis longitudinal thereto whereby to pivot said fingers from a position substantially directly overlying the sieve to a position raised therefrom at an acute angle thereto.

Effectively, therefore, the invention provides a plurality of fingers which are reciprocated at the feed end of the sieve at a rate which acts to lift the mat of chaff and grain into the air above the sieve so that even in heavy crop conditions the mat is broken up and cannot form a layer which inhibits the proper separation. Furthermore the movement of the grain and chaff away from the sieve is no longer dependent strictly upon the airflow through the sieve but is also dependent upon the movement of the fingers so that in light crop conditions the movement of the grain and chaff is not so violent as to discharge grain from the discharge end of the sieve.

In a particularly preferred arrangement, the movement of the fingers, that is the pivot bar on which they are mounted is obtained most effectively by simply a pair of levers one of which is attached to the bar while it reciprocates with the pan and sieve and the other of which is attached to a free end of the first and to a fixed housing surrounding the cleaning sieve so that the bar is rotatingly reciprocated by its own longitudinal reciprocation.

With the foregoing in view, and other advantages as will become apparent to those skilled in the art to which this invention relates as this specification proceeds, the invention is herein described by reference to the accompanying drawings forming a part hereof, which includes a description of the best mode known to the applicant and of the preferred typical embodiment of the principles of the present invention, in which:

DESCRIPTION OF THE DRAWINGS

FIG. 1 is a schematic cross sectional view of the operational parts of a combine harvester incorporating the invention.

FIG. 2 is a cross sectional view along the lines 2—2 of FIG. 1.

FIG. 3 is a side elevational view of a portion of FIG. 1 showing the lever system for driving the pivot bar of FIG. 1.

In the drawings like characters of reference indicate corresponding parts in the different figures.

DETAILED DESCRIPTION

The combine harvester of FIG. 1 shows only the operative parts for separation of grain and chaff from straw together with the separation of the grain from chaff. Thus the conventional combine comprises a cylinder and concave 10, 11 and beater 12 together with straw walkers 13 all of which are shown only schematically as they are of conventional design and are only exemplary in nature.

A grain pan 14 is positioned beneath the concave 11 and beneath a discharge portion of the straw walkers 13 so that all chaff and grain drops onto the grain pan for collection and transportation. The grain pan has a discharge end 15 transverse to the length thereof and is formed from ribbed material with the ribs or ridges running transverse to the length of the pan so that reciprocation in a longitudinal direction as indicated by the arrow 16A causes the grain and chaff to move or work itself along the pan toward the discharge end 15.

A cleaning sieve is indicated at 16 and comprises a plurality of flat plate members 17, 18, 19 which are staggered so as to lie parallel, spaced and off-set so that the plate members effectively form a complete surface with openings between the plate members indicated at 20, 21. As best shown in FIG. 2, the plate members 18 and 19 separated by the opening 21 are supported in that spacing by a plurality of parallel spacer plates 22. Similar spacer plates are arranged between the plate members 17 and 18 and of course between the remaining plate members which are not specifically identified. The spacer plates 22 can be pivoted relative to each of the plate members 18 and 19 so as to adjust the spacing between the plate members 18 and 19.

A second sieve 23 of similar construction to the first is positioned beneath the first so as to receive grain from the first and to carry out a further cleaning action prior to deposit of the grain onto a collection pan 24 for transportation to a storage location.

A fan 25 is positioned beneath the sieves 16 and 23 so that air is directed thereby through the openings 20, 21 in an amount dependent upon a baffle 26.

The pan 14 and sieves 16, 23 are coupled to an inner housing member 27 which is longitudinally reciprocable by a lever and crank mechanism 28. Thus the pan and sieves reciprocate longitudinally in the direction of the arrow 16 so as to work the grain and chaff from the deposit point toward the discharge end of the pan and along the sieve toward a discharge end thereof indicated at 29.

As is well known separation of grain from chaff is carried out by the relative effects of gravity and airflow on the heavier denser grain relative to the lighter chaff. Thus the grain tends to fall backwardly through the openings 20, 21 while the chaff is blown from the sieve in a stream and discharged from the end 29.

The above arrangements are conventional and are illustrated schematically with the specific details of inclination, structure and location being exemplary.

In the modification according to the present invention, there is provided a pivot bar 30 which is mounted for rotation about its longitudinal axis in the inner housing 27 and particularly through openings 271 in the sides 272 thereof as best shown in FIG. 2. The bar 30 has rigidly attached thereto a plurality of parallel coextensive fingers 31 which extend from the bar at right angles thereto over an along the sieve 16 toward the discharge end 29 thereof. In one example the length of the sieve 16 can be of the order of 54 inches and the length of the fingers of the order of 16 inches. The bar 30 as best shown in FIG. 1 is positioned beneath the sieve pan 14 that is behind the forward most or discharge end 15 so as to be covered thereby so that grain and chaff falling from the discharge end 15 bypasses the bar 30 for deposition upon the fingers 31 or directly onto the sieve 16; the bar 30 is thus mounted directly at the feed end of the sieve 16 with the whole of the fingers extending therefrom over the sieve 16 for cooperation therewith and with the air stream passing therethrough.

An outer housing of the combine is indicated at 32 comprising sides 33 and 34. Each of the sides includes a slot 35 having a height substantially equal to the diameter of the bar 30 and a length substantially equal to the stroke of the crank 28 so as to accommodate the forward and rearward reciprocating movement of the bar 30 together with the sides 272 of the housing 27.

One end of the shaft 30 is fixedly welded or attached to a lever 36 which extends therefrom in a generally vertically downward direction outside of the frame side 33. A second lever 37 is coupled to the first lever 36 at a pivot bearing 38 including a bearing shell 381 welded to the lever 36 and a clevis 382 welded to the lever 37. An end of the second lever 37 remote from the pivot coupling 38 is attached to the fixed frame side 33 at a lug 39 by a pivot coupling 40. Each of the levers 36 and 37 comprises a tube portion 412 carrying a nut 41 and a threaded rod portion 411 which can be screwed into the nut whereby the position of the pivot bearing 38 can be adjusted relative to each of the levers so as to adjust the effective length of the respective lever in relation to its opposed end.

The attachment comprising the bar 30, fingers 31 and drive mechanism therefor can be applied to original equipment as part of the manufacturing process or can be supplied as a kit of parts for attachment to an existing combine harvester. Particularly in relation to the kit of parts, the adjustment provided by screw threads can provide two such adjustments. Firstly the choice of opening in the lever 36 varies the angle through which the fingers 31 move for each reciprocation of the bar 30 in the direction of the arrow 16. Secondly the choice of the opening in the lever 37 sets the initial angle of the fingers relative to the sieve 16. In practice, with the pivot bar 30 positioned above the sieve by a distance of the order of one inch, the fingers at their lowest position are adjusted so as to be parallel to the sieve 16 by adjusting the length of the lever 37. The length of the lever 36 is then chosen to set the angle of movement of the fingers from the lower most position in which the ends of the fingers move by a distance of the order of three inches.

Surprisingly it has been found that this simple movement of the fingers in synchronism with the longitudinal reciprocating movement of the sieve 16 causes a significantly improved separation of grain and chaff which is very much less dependent upon the airflow characteristics.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What is claimed is:

1. A combine harvester for harvested crop comprising means for separating grain and chaff from straw of the harvested crop, a grain pan onto which the separated grain and chaff is deposited from said separating means, said grain pan having a discharge end from which the grain and chaff can fall, a cleaning sieve, means defining a plurality of openings therein, means mounting said sieve with a feed end thereof adjacent said discharge end of said grain pan for receiving said grain and chaff, fan means arranged beneath said sieve for directing air through said openings whereby the air passing therethrough tends to separate heavier grain from lighter chaff so that the grain passes through the openings under gravity while the chaff is discharged from a discharge end of said sieve remote from said feed end, means for reciprocatingly moving said grain pan and said sieve in a direction parallel to the direction of movement of said grain and chaff therealong, a pivot bar member arranged transversely of said direction of movement, grain and chaff engaging fingers mounted on said pivot bar member arranged in parallel, spaced, coextensive relation along the pivot bar member, means mounting said pivot bar member at said feed end of said cleaning sieve such that effectively the whole of each finger extends therefrom over and along said cleaning sieve toward said discharge end of said cleaning sieve to a position spaced from said discharge end, and is exposed to said air, and means for reciprocatingly pivoting said pivot bar member about an axis longitudinal thereto whereby to pivot said fingers from a position substantially directly overlying the sieve to a position raised therefrom at an acute angle thereto, said pivot bar member being arranged to reciprocate longitudinally with said pan and sieve, said means for reciprocating the pivot bar member comprising a first lever having one end fixed to said pivot bar member and a second lever having one end thereof pivotally coupled to said first lever at an end of the first lever remote from said one end of the first lever and an opposed end of said second lever being pivotally coupled to a fixed point on a frame member stationary relative to said pan and sieve whereby longitudinal reciprocating movement of said pivot bar member causes said levers to reciprocatingly pivot said pivot bar member about said longitudinal axis.

2. The invention according to claim 1 wherein the length of the first lever between said pivot bar member and said second lever is adjustable.

3. The invention according to claim 1 wherein the length of the second lever between said frame member and said first lever is adjustable.

4. The invention according to claim 1 wherein said frame member comprises an outer housing within which said grain pan and cleaning sieve are longitudinally moveable and wherein said pivot bar member includes a portion extending through said housing and means defining a slot in said housing to accommodate longitudinal movement of said pivot bar member.

5. The invention according to claim 1 wherein said pivot bar member is arranged underneath said discharge end of said grain pan and covered thereby whereby grain and chaff from said discharge end falls beyond said pivot bar member onto said finger means.

6. The invention according to claim 1 wherein ends of said finger means remote from said pivot bar members are reciprocated through a distance of the order of three inches.

7. The invention according to claim 1 wherein the length of the finger means is of the order of 16 inches.

* * * * *